United States Patent
Ashton et al.

(10) Patent No.: US 6,725,350 B2
(45) Date of Patent: Apr. 20, 2004

(54) STORAGE MANAGEMENT SYSTEM, APPARATUS, AND METHOD FOR SUPPORTING A MULTIPLICITY OF LOGICAL BLOCK IDENTIFICATION

(75) Inventors: Lyn Lequam Ashton, Tucson, AZ (US); Kirby Grant Dahman, Tucson, AZ (US); Erika Marianna Dawson, Tucson, AZ (US); Kathryn Eileen Eldred, Tucson, AZ (US); Gavin Stuart Johnson, Aromas, CA (US); Jon Arthur Lynds, San Jose, CA (US); Michael Ray Noel, Tucson, AZ (US); Anthony Steve Pearson, Tucson, AZ (US); James Mitchell Ratliff, Benson, AZ (US); Wayne Erwin Rhoten, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 09/968,603

(22) Filed: Oct. 1, 2001

(65) Prior Publication Data

US 2003/0065903 A1 Apr. 3, 2003

(51) Int. Cl.$^7$ .............................................. G06F 12/00
(52) U.S. Cl. ....................................................... 711/172
(58) Field of Search ......................................... 711/172

(56) References Cited

PUBLICATIONS

IBM, DFSMS/MVS Version 1 Release 3, GC26–4900–04, General Information, 1980, pp. 1–155.
IBM, DFSMS/MVS Version 1 Release 4, GC26–4900–05, General Information, 1980, pp. 1–167.
IBM, DFSMS/MVS Version 1 Release 3, SH21–1076–02, General Information, 1984, pp. 1–594.

*Primary Examiner*—Hiep T. Nguyen
(74) *Attorney, Agent, or Firm*—Dale F. Regelman

(57) ABSTRACT

A storage management system, apparatus, and method to increase the storage capacity of data storage media. Applicants' method uses a data storage device comprising a fixed device architecture, where that data storage device is capable of operating in a first capacity mode or in a second capacity mode, and where that data storage device is capable of switching between the first capacity mode and the second capacity mode. In certain embodiments, the first capacity mode utilizes a 22 bit blockid format and the second capacity mode utilizes a 32 bit blockid format. In other embodiments, the first capacity mode utilizes a 32 bit blockid format and the second capacity mode utilizes a 22 bit blockid format.

A computer code product comprising a data management system which includes an operating system and data storage device microcode, which supports the capability to switch between alternative information storage architectures, and thereby, increase the capacity utilization of data storage media.

A data storage and retrieval system comprising a computer useable medium having computer readable program code disposed therein for implementing Applicants' method to switch between use of alternative information storage architectures, and thereby, to increase the capacity utilization of data storage media.

36 Claims, 7 Drawing Sheets

STORAGE MANAGEMENT SYSTEM, APPARATUS, AND METHOD FOR SUPPORTING A MULTIPLICITY OF LOGICAL BLOCK IDENTIFICATION

FIELD OF THE INVENTION

Applicants' invention relates to a data storage management system, apparatus, and method to permit a computer system to record information in alternative information storage architectures using a data storage device having a fixed device architecture. Applicants' invention further relates to a data storage management system and method to increase the storage capacity utilization of data storage media.

BACKGROUND OF THE INVENTION

An explosion of computer data and information requires an ever increasing amount of computer readable storage space. Increasing data storage capacity requires improved storage management systems to backup and protect data sets, and migrate less active data sets to secondary storage to increase primary storage space. A data set consists of any collection or grouping of data. In certain systems, a data set may include control information used by the system to manage the data. The terms data set and file are generally equivalent and sometimes are used interchangeably. Hierarchical storage management (HSM) programs manage storage devices, such as tape libraries, to control the flow of data between primary and secondary storage facilities.

In a hierarchical storage management system, data is stored in different types of storage devices depending upon the frequency of usage of the data. For instance, a system may include multiple storage media types to store data having different usage patterns and likelihoods of access. More frequently used data may be stored on direct access storage devices (DASD) comprising high-performance rapid access storage devices, such as hard disk drives. Such readily accessible data is sometimes referred to as level zero volumes. Less frequently used data may be archived on slower and less expensive, demountable storage media, such as optical disks, magnetic tape cartridges, etc. Such archive volumes are often referred to as level two storage.

Two common functions initiated by host systems in hierarchical storage management systems include migration and recall. Migration involves the movement of data from level 0 to level 1 or to level 2 storage to make more room for more frequently accessed data on the primary level 0 storage devices. If a host system attempts to access a data set that has been migrated to level 1 or level 2 storage, then the recall function would be initiated to move the requested data sets to level 0.

International Business Machines Corporation (IBM®) provides the Data Facilities Storage Management Subsystem (DFSMS®) software which is included in the IBM MVS/ESA™, OS/390®, and z/OS® operating systems. This software allows host systems to perform hierarchical storage management operations, such as migration and recall. DFSMS and OS/390 are registered trademarks of IBM, and MVS/ESA is a trademark of IBM. The operation and implementation of the DFSMS system are described in IBM publications "DFSMS/MVS VIR3 General Information," IBM document no. GC26-4900-04 (IBM Copyright, 1980, 1995) and "DFSMS/MVS VIR3 DFSMShsm Storage Administration Guide," IBM document no. SH21-1076-02 (IBM Copyright 1984, 1995), which publications are incorporated herein by reference in their entirety.

Certain prior art HSM programs, tape operating systems, and data storage devices utilize a 22-bit block id format. Using a block size of 16 kilobytes, such a 22-bit blockid format can accommodate a maximum number of about 4,000,000 blocks. When this maximum number of blocks is encountered, the data storage subsystem returns a logical end-of-tape indication, and the volume, i.e. the tape, is regarded by the host computer as "filled" regardless of the actual physical space still available. On the other hand, use of a 32 bit file block addressability mode allows storage of more than 4,000,000,000 blocks per volume, such as a magnetic tape.

What is needed is an data management system and method that supports the capability to switch between alternative blockid architectures, i.e. between a 22 bit blockid format and a 32 bit blockid format, and vice versa. Applicants' invention includes a data management system comprising an HSM program, a data storage and retrieval system operating system, and data storage device microcode; apparatus including a data storage and retrieval system and a data storage device; and a method using Applicants' data management system and apparatus, to implement the capability to switch between alternative information storage architectures, and thereby, to increase the capacity utilization of data storage media.

SUMMARY OF THE INVENTION

Applicant's invention includes a method to increase the storage capacity of data storage media. Applicants' method uses a data storage device comprising a fixed device architecture, where that data storage device is capable of operating in a first capacity mode or in a second capacity mode, and where that data storage device is capable of switching between the first capacity mode and the second capacity mode. In certain embodiments, the first capacity mode utilizes a 22 bit blockid format and the second capacity mode utilizes a 32 bit blockid format. In other embodiments, the first capacity mode utilizes a 32 bit blockid format and the second capacity mode utilizes a 22 bit blockid format.

Further according to Applicants' method, the data storage device receives a request from a host computer to record designated information on a designated data storage media using a specified capacity mode. In response to that request, Applicants' method switches the data storage device from its default capacity mode to the specified capacity mode, and then records the designated information on the designated data storage medium using that specified capacity mode.

Applicants' invention further includes a computer code product comprising a data management system which includes hierarchical storage manager program, a data retrieval system operating system, and data storage device microcode, which supports the capability to switch between alternative information storage architectures, and thereby, increase the capacity utilization of data storage media.

Applicants' invention further includes a data storage and retrieval system comprising a computer useable medium having computer readable program code disposed therein for implementing Applicants' method to support the capability to switch between use of alternative information storage architectures, and thereby, to increase the capacity utilization of data storage media.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's method to record information to a movable tape medium, or to a movable tape medium disposed within a portable data storage cartridge is not meant, however, to limit Applicant's invention to either data storage and retrieval systems, or to magnetic tape applications, as the invention herein can be applied to data storage media in general.

Figure 3:
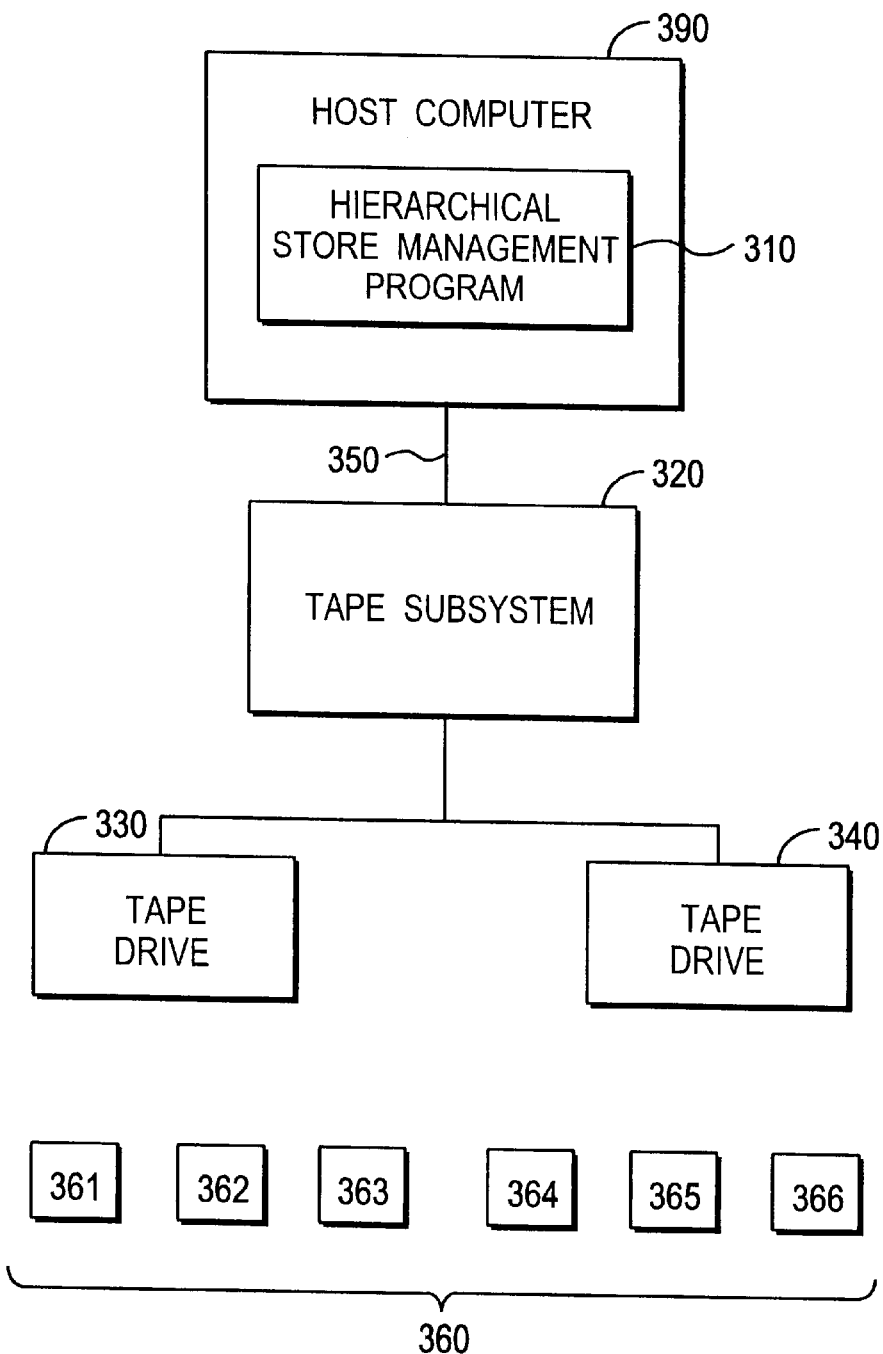
FIG. 3 is a block diagram showing the hardware and software components of Applicants' data storage and retrieval system.

FIG. 3 illustrates the hardware and software environment in which preferred embodiments of the present invention are implemented. Host system 390 includes Applicants' hierarchical storage management (HSM) program 310 as well as other host computer applications. Information is transferred between the host system 390 and secondary storage devices managed by a data storage and retrieval system, such as tape subsystem 320, via communication link 350. Communication link 350 comprises a serial interconnection, such as an RS-232 cable or an RS-432 cable, an ethernet interconnection, an ESCON interconnection, a FICON interconnection, a SCSI interconnection, a Fibre Channel interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, tape subsystem 320 includes tape drives 330 and 340. In other embodiments of Applicants' data storage and retrieval system, tape subsystem 320 includes a single data storage drive. In alternative embodiments, Applicants' data storage and retrieval system 320 includes more than two data storage drives.

A plurality of portable data storage media 360 are stored within Applicants' data storage and retrieval system. In certain embodiments, plurality of data storage media 360 are each housed in a portable data storage cartridge 370, such as plurality of portable tape cartridges 370 (not shown in FIG. 3). Each of such portable data storage cartridges may be inserted in one of tape drives, and thereafter accessed by the tape subsystem 320. In alternative embodiments, alternative storage media may be substituted for the tape cartridges 370. Any type of non-volatile storage media could be used, including optical disks, holographic units, digital video disc (DVD), compact disc-read only memory (CD-ROM), non-volatile random access memory (RAM), etc.

The tape subsystem 320 further includes program logic to manage tape drives 330 and 340, and plurality of tape cartridges 370. In alternative embodiments, tape subsystem 330 and host system 390 may be located on a single computer machine.

Host system 390 comprises a computer system, such as a mainframe, personal computer, workstation, etc., including an operating system such as Windows, AIX, Unix, MVS, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The HSM program 310 in the host system 390 may include the functionality of HSM type programs known in the art that manage the transfer of data to a tape library, such as the IBM DFSMS implemented in the IBM MVS operating system.

The IBM DFSMS software is described in "DFSMS/MVS V1R4 General Information," IBM document no. GC26-4900-05, published by IBM (Copyright 1997, IBM), which publication is incorporated herein by reference in its entirety. In addition to including known HSM functions, such as recall and migration, the HSM program 310 would further include additional program instructions to perform the operations of the preferred embodiments of the present invention. The HSM program 310 may be implemented within the operating system of the host system 390 or as a separate, installed application program.

The tape subsystem 320 comprises a computer system, and manages a plurality of tape drives and tape cartridges. The tape drives 330 and 340 may be any suitable tape drives known in the art, e.g., the Magstar 3590 tape drives. Tape cartridges 370 may be any suitable tape cartridge device known in the art, (Magstar is a registered trademark of IBM Corporation) such as ECCST, Magstar, IBM 3420, 3480, 3490E, 3590 tape cartridges, etc. The tape subsystem 320 may be a manual tape library in which the user must manually mount tape cartridges 370 into the tape drives 330/340, or an automated tape library (ATL) in which a robotic arm mounts tape cartridges 370 in the library into the tape drives 330/340.

Figure 1A:
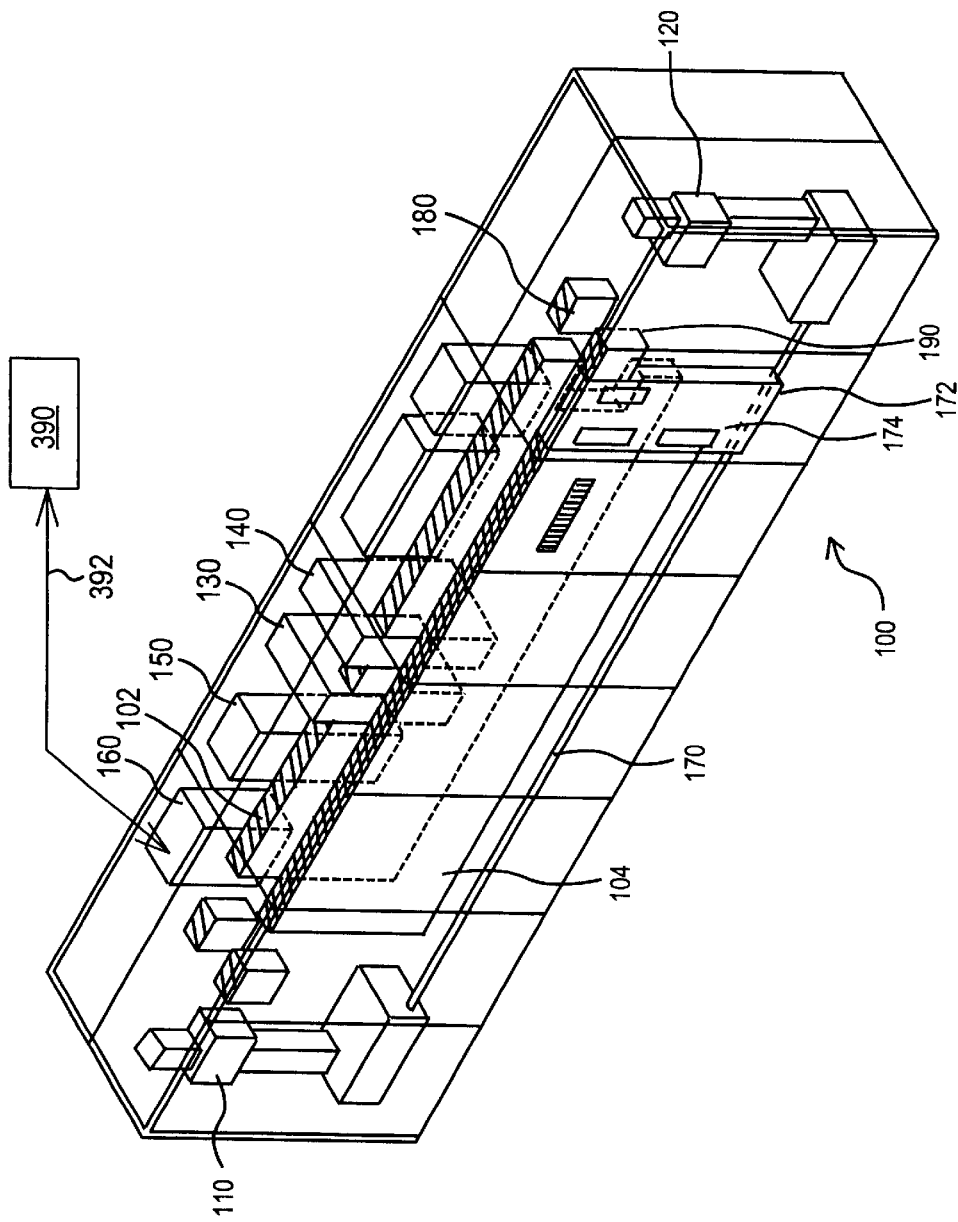
FIG. 1A is a perspective view of a first embodiment of Applicants' data storage and retrieval system.

For example referring now to FIG. 1, automated data storage and retrieval system 100 is shown having a first wall of storage slots 102 and a second wall of storage slots 104. Portable data storage cartridges, such as tape cartridges 370, are individually stored in these storage slots.

Figure 1B:
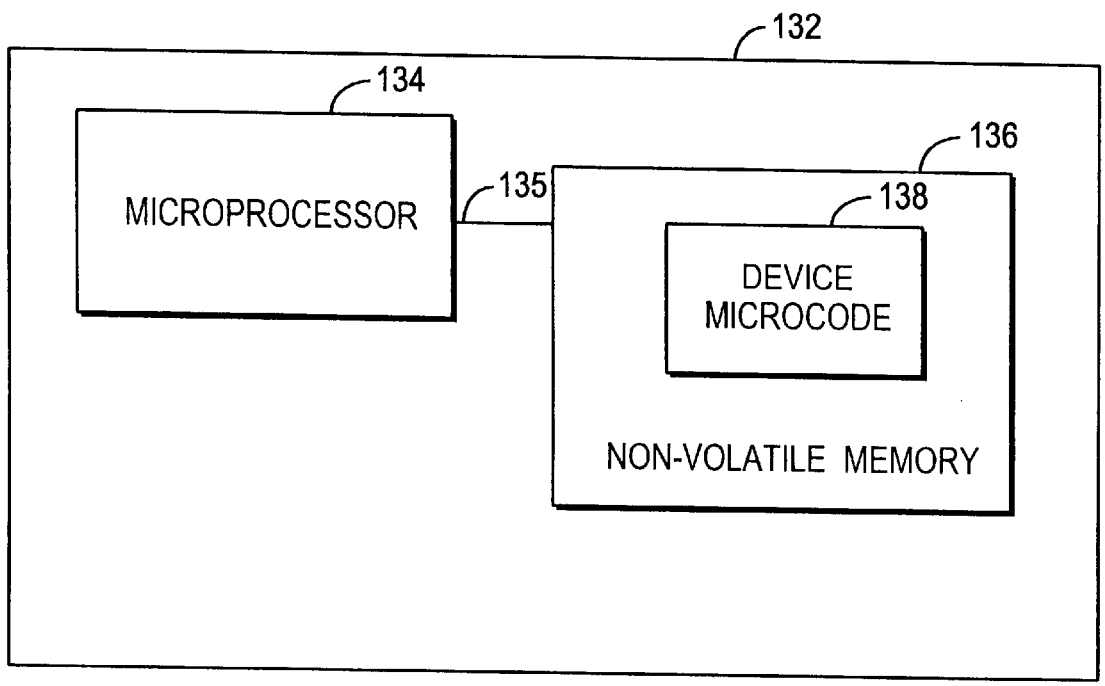
FIG. 1B is a block diagram showing certain components disposed in the controller disposed in Applicants' data storage and retrieval system.

Data storage and retrieval system 100 includes one or more accessors, such as accessors 110 and 120. An accessor is a robotic device which accesses portable data storage media from first storage wall 102 or second storage wall 104, delivers that accessed media to data storage devices 130/140 for reading and/or writing data thereon, and returns the media to the proper storage slot. Referring now to FIG. 1B, data storage device 130 includes device controller 132. Controller 132 includes microprocessor 134 in communication with non-volatile memory 136. In certain embodiments, microprocessor 134 communicates with non-volatile memory 136 via communication link 135. In other embodiments, non-volatile memory 136 is integral to microprocessor 134. Device microcode 138 is stored in non-volatile memory 136. Device microcode comprises a computer program product which controls the operation of a data storage device, such as data storage device 130 (FIG. 1A)/140 (FIG. 1A)/230 (FIG. 2).

Library controller 160 controls the operation of data storage and retrieval system 100. In certain embodiments, controller 160 is integral to host computer 390. In alternative embodiments, controller 160 is external to host 390. In those external controller embodiments, library controller 160 communicates with host computer 390 via communication link 392.

Operator input station 150 permits a user to communicate with Applicant's automated data storage and retrieval system 100. Devices 180 and 190 each comprise a Direct Access Storage Device ("DASD") cache. In certain embodiments DASD cache 180 and 190 comprise a plurality of hard disk drives which are configured into one or more RAID arrays. In certain embodiments, information transferred between host computer 390 and data storage and retrieval system 100 is buffered in DASD caches 180 and 190. Import/export station 172 includes access door 174 pivotably attached to the side of system 100. Portable data storage cartridges can be placed in the system, or in the alternative, removed from the system, via station 172/access door 174.

Figure 2:
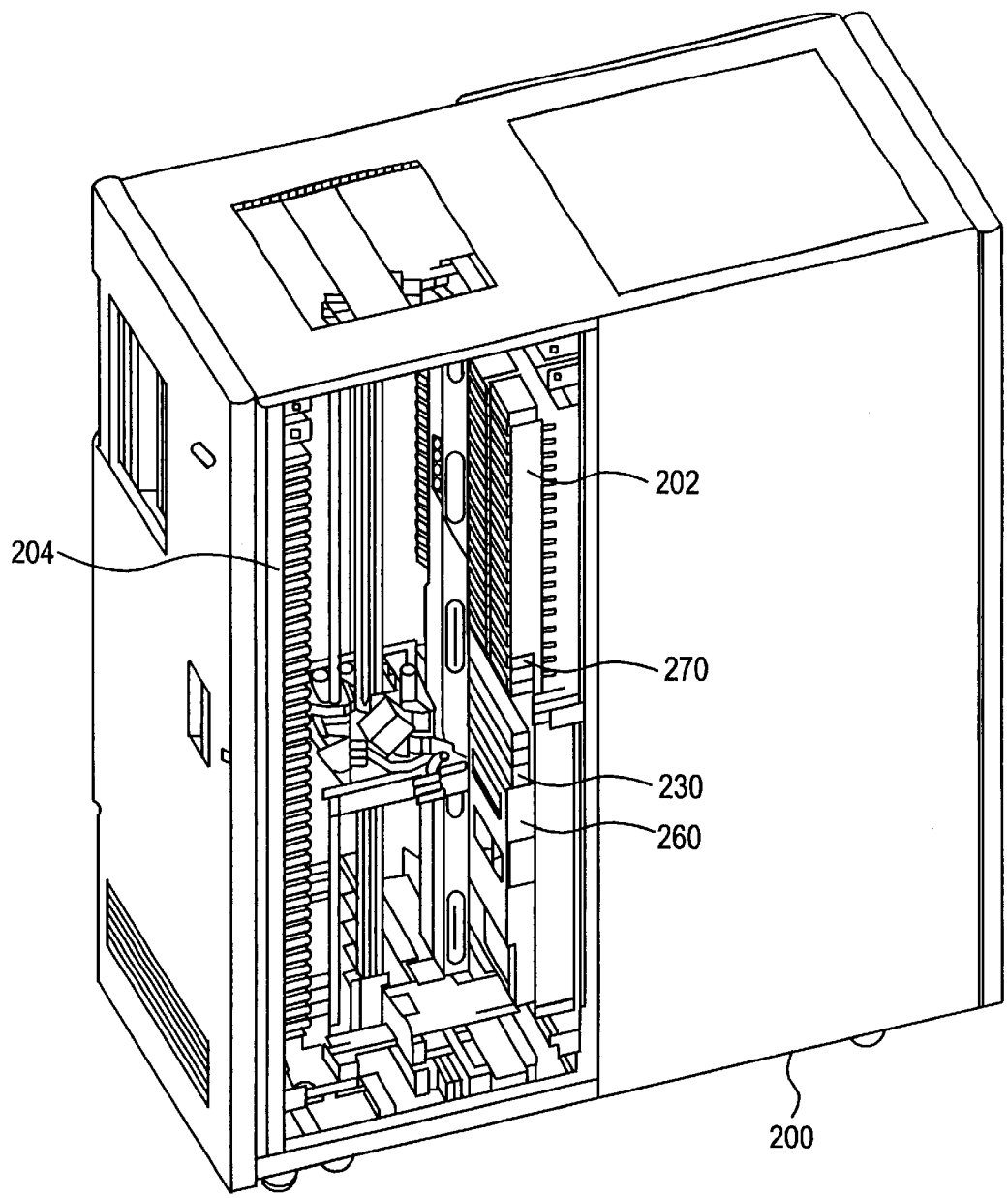
FIG. 2 is a perspective view of a second embodiment of Applicants' data storage and retrieval system.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage cartridges. System 200 includes one or more data storage devices, such as device 230. Device 230 comprises a floppy disk drive, an optical disk drive, a magnetic tape drive, and the like. System 200 further includes operator control panel 250 (not shown in FIG. 3).

System 200 further includes library controller 260. Library controller 260 controls the operation of assessor 210 and data storage device 230. System 300 further includes one or a plurality of portable data storage cartridges, such as tape cartridges 360 (FIG. 3). Each cartridge contains a data storage media internally disposed therein, such as data storage media 360 (FIG. 3).

Referring again to FIG. 3, tape subsystem 320, such as data storage and retrieval system 100/200, receives commands from the HSM program 310 in the host system 390 and performs the operations requested by the HSM program 310, such as migration and recall, to transfer data between the host system 390 and the components managed by the tape subsystem 320. In preferred embodiments, the tape subsystem 320 can simultaneously process numerous input/output requests from the host system 390 and any other attached system directed toward the tape drives 330/340 and tape cartridges 370 managed by the tape subsystem 320. Moreover, in certain embodiments HSM program 310 in the host system 390 is capable of multi-tasking, simultaneously executing numerous input/output operations, and simultaneously transmitting multiple I/O requests to the tape subsystem 320 to execute.

In further embodiments, a plurality of host systems 390 may communicate with the tape subsystem 320 and/or a host system 390 may communicate and transfer data to a plurality of tape subsystems 320, each subsystem providing access to a library of tape cartridges.

Figure 4:
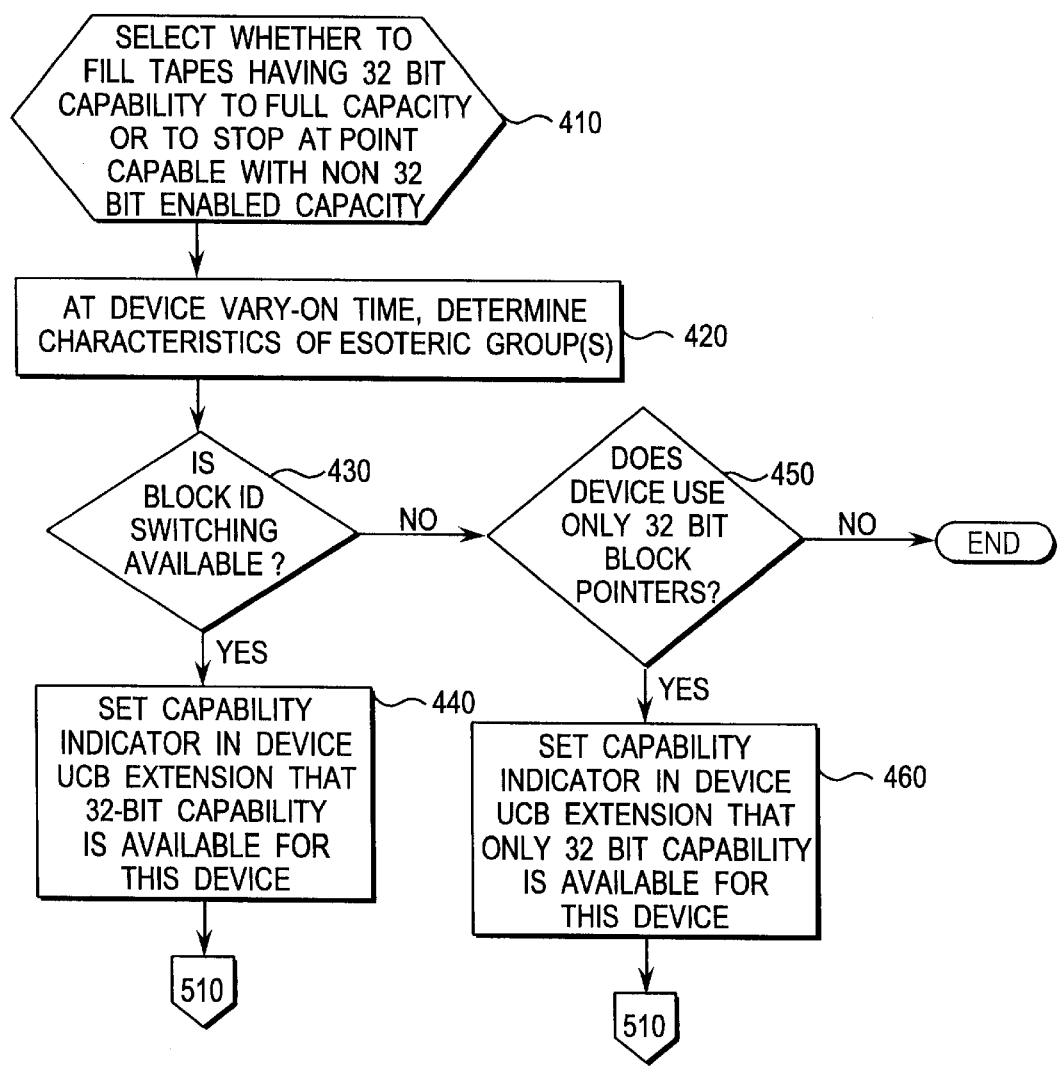
FIG. 4 is a flowchart summarizing the steps in Applicants' method to configure a data storage device to use alternative information storage architectures.

FIG. 4 summarizes certain steps in Applicants' method to adaptively support the capability to switch between use of alternate blockid architectures. In step 410, the library user initially specifies the blockid format to be used by each data storage drive in the data storage and retrieval system, such as drives 130 (FIG. 1), 140 (FIG. 1), and 230 (FIG. 2). As those skilled in the art will appreciate, an "esoteric group" comprises a group of devices having some commonality of characteristics and intended use(s). In this regard, one or more esoteric groups can be defined which include one or more of the data storage devices extant in Applicants' data storage and retrieval system. In certain embodiments, certain applications running on one or more host computers may direct certain requests, i.e. data migration and/or data recall, to specified esoteric groups rather than to individual data storage devices. In addition to configuring each individual data storage device, the user also defines each esoteric group.

In certain embodiments, specifying the addressing mode, i.e. the blockid format, to be used by a data storage device comprises specifying a CAPACITYMODE attribute for that device. In certain embodiments, the CAPACITYMODE attribute has two extensions, namely COMPATIBILITY and EXTENDED.

When the user configures a device, such a data storage device 130/140/230 using the CAPACITYMODE (EXTENDED) attribute, then that device is enabled to utilize the 32 bit blockid architecture, thereby allowing complete utilization of the physical space available on a data storage tape medium mounted therein. Information recorded on tapes using the 32 bit blockid architecture is generally only accessible to CAPACITY MODE(EXTENDED) data storage devices.

On the other hand, if the user configures a data storage device using the CAPACITYMODE(COMPATIBILITY) attribute, then that device will record information using the 22 bit blockid architecture. Information recorded on tapes using the 22 bit block id architecture is generally accessible to both CAPACITYMODE switchable devices and devices not having CAPACITYMODE switching support.

In step 420, the library controller, such as controller 160 (FIG. 1) or controller 260 (FIG. 2), at the device vary-on time, ascertains the information architecture capabilities of each data storage device in each defined esoteric group. By information architecture, Applicants' mean the blockid format capabilities of the data storage device. In certain embodiments, the library controller queries the device using a READ DEVICE CHARACTERISTICS ("RDC") command. In these embodiments, Applicants' operating system includes such an RDC command.

In step 430, the library controller, using information obtained from the RDC command, ascertains if the data storage device includes CAPACITYMODE switching support. Thereafter, in step 440 the controller sets a capability indicator in the data storage device's Unit Control Block Tape Class Extension ("UCBCX") to show that 32 bit capability is available for that device.

In certain embodiments, Applicants' operating system includes a UCBCX_BLKPTR_SWITCH attribute. In these embodiments, the library controller, such as controller 160 (FIGS. 1A, 2), indicates that CAPACITYMODE switching capability is available by setting the device's UCBCX_BLKPTR_SWITCH attribute to "ON." In the event in step 450 the library controller determines by interrogating a data storage device using the RDC command that that device is only capable of using 32 bit block pointers, then in step 460 the controller sets a capability indicator in the data storage device's UCBCX to show only 32 bit capability is available for that device. In certain embodiments, Applicants' operating system includes a UCBCX_32BIT_BLKPTR attribute. In these embodiments, in step 460 the controller sets the device's UCBCX_32BIT_BLKPTR attribute to "ON" to indicate that the data storage device can only use a 32 bit blockid format.

Figure 5:
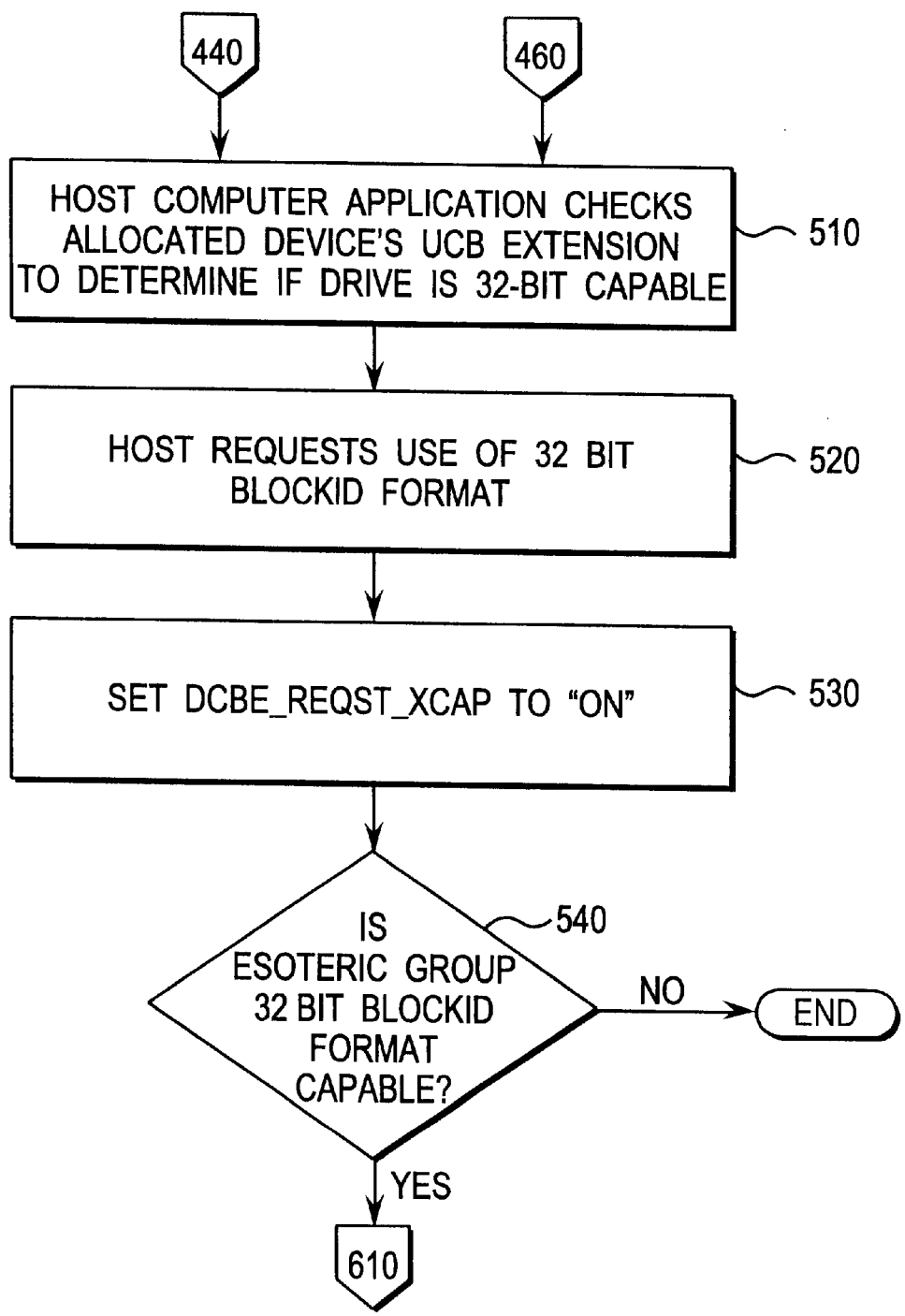
FIG. 5 is a flowchart summarizing the steps in Applicants' method whereby an application running on a host computer requests a certain information storage architecture be used to record certain designated data on a designated data storage medium.
Figure 6:
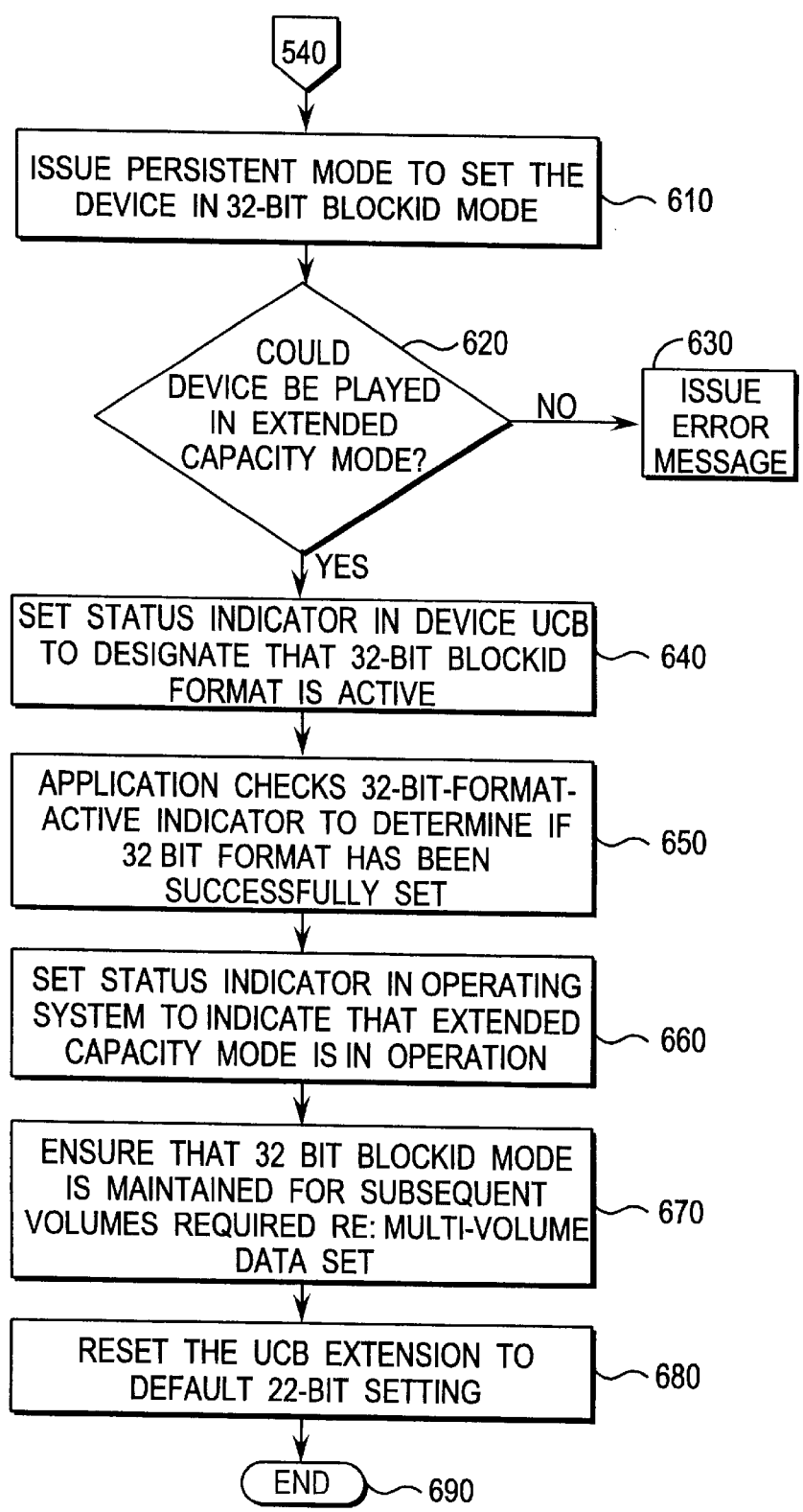
FIG. 6 is a flowchart summarizing additional steps in Applicants' method whereby an application running on a host computer requests a certain information storage architecture be used to record certain designated data on a designated data storage medium.

FIG. 5 summarizes the steps of Applicants' method by which an application, such as Hierarchical Storage Management Program 310 (FIG. 3), running on a host computer, such as host computer 390 (FIG. 3), can utilize the CAPACITYMODE switching capability of Applicants' data storage management system. In step 510, HSM 310 examines each defined esoteric group. Based upon that examination of the UCBCX for each device comprising an esoteric group, HSM creates a USERUNITTABLE which shows whether all the devices in that esoteric group are switchable between a 22 bit blockid format and a 32 bit blockid format.

In the event all devices in an esoteric group are blockid format switchable, then the USERUNITTABLE indicates that all devices are switchable. In the event all the devices in an esoteric group are not switchable, then the USERUNITTABLE indicates that none of those devices are switchable, even if a subset the devices comprising that esoteric group can be switched. This configuration of esoteric groups enforces consistency in the effective attributes of the devices in each esoteric group.

If HSM determines in step 510 that the allocated esoteric group is 32 bit blockid format capable, and if the user has requested use of the 32 bit blockid format, then in step 520 the application requests use of the 32 bit blockid format when writing certain designated information to a designated data storage medium. In certain embodiments of Applicant's method and computer code product, the application, such as HSM 310, includes a CAPACITYMODE=XCAP command. In these embodiments, the request of step 520 to use a 32 bit blockid format comprises issuing a CAPACITYMODE=XCAP command.

In the event the application running on host 390 issues a CAPACITYMODE=XCAP command, then in step 530 a request indicator is set in the operating system. In certain embodiments, a DCBE macro is invoked to request use of the 32 bit mode via the DCBE_REQST_XCAP attribute. In these embodiments, issuing a CAPACITYMODE=XCAP command by the host computer application causes the DCBE_REQST_XCAP attribute to be set to "ON."

In the event the operating system ascertains that the host computer application is requesting use of the 32 bit blockid format, then in step 540 the operating system checks the allocated device's UCB to verify that the allocated data storage device, such as data storage device 130 (FIG. 1) 140 (FIG. 2) 230 (FIG. 2), is 32 bit blockid format capable. In the event the operating system verifies such 32 bit capability, then Applicants' method transitions to step 610.

In step 610, the DCBE macro makes a call to the Devices Services macro. The Devices Services macro then issues a MODE SET(X) command to place the allocated data storage device in the 32 bit blockid format. In step 620, the operating system verifies that the allocated device was successfully switched to the extended capacity mode, i.e. to the 32 bit blockid format. In the event the operating system determines in step 620 that the allocated drive was not successfully placed in the extended capacity mode, then the operating system issues an error message in step 630.

In the event the operating system determines in step 620 that the allocated data storage device was successfully placed in the extended capacity mode, then in step 640 the operating system sets a status indicator in the device's UCBCX showing that the 32 bit blockid format is now active in that device. In certain embodiments, Applicants' operating system includes a UCBCX_32BIT_INUSE attribute. In these embodiments, the UCBCX_32BIT_INUSE attribute to is set to "ON" in step 640.

In step 650, host computer 390 verifies operation of the allocated data storage device in the extended capacity mode by checking the allocated data storage device's UCBCX to determine if the UCBCX_32BIT_INUSE attribute is set to "ON."

If host computer 390 determines that the allocated device is operating in the 32 bit blockid format, then in step 660 host 390 sets a status indicator in the DCBE macro showing that the allocated data storage device is operating in the extended capacity mode. In certain embodiments, the DCBE macro includes a DCBE_32BIT-INUSE attribute. In these embodiments, in step 660 the DCBE_32BIT-INUSE attribute associated with the allocated storage device is set to "ON" indicating that the allocated device is operating in the extended capacity mode.

In the event subsequent volumes, such as one or more of media 361, 362, 363, etc., are mounted for a multi-volume data set, host computer 390 in step 670 ensures that the 32 bit blockid format is maintained when writing information to those subsequent volumes. During data set closing operations, the operating system in step 680 resets the data storage device's UCBCX to the default 22 bit setting.

Applicants' invention includes a data storage and retrieval system comprising a computer useable medium having computer readable program code disposed therein for implementing Applicants' method to record information in alternative information storage architectures using a data storage device having a fixed device architecture. Applicants' invention includes a data storage and retrieval system comprising a computer useable medium having computer readable program code disposed therein for implementing Applicants' method to increase the capacity utilization of data storage media.

Applicants' invention further includes a data management system comprising computer program products embodied as program code stored in one or more storage devices, such as a magnetic disk, a magnetic tape, or other non-volatile memory device disposed, for example, in a host computer, a data storage device, or a library controller. The programming of the present invention may comprise a computer program product embodied as program code stored in a storage device, such as a magnetic disk drive or memory, etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to increase the storage capacity of a data storage medium, comprising the steps of:
    providing a first data storage device comprising a fixed device architecture, wherein said first data storage device is capable of operating in a default capacity mode or in an extended capacity mode, wherein said first data storage device is capable of switching between said default capacity mode and said extended capacity mode, and wherein said default capacity mode utilizes a 22 bit blockid format and said extended capacity mode utilizes a 32 bit blockid format;

providing a designated data storage medium;

providing designated information;

removeably disposing said designated data storage medium in said first data storage device;

receiving a request to record said designated information on said designated data storage medium using said extended capacity mode;

switching said first data storage device to said extended capacity mode; and recording said designated information on said designated data storage medium using said extended capacity mode.

2. The method of claim 1, further comprising the step of switching said first data storage device to said default capacity mode from said extended capacity mode after recording said designated information on said designated storage media.

3. The method of claim 1, further comprising the steps of:

providing a plurality of data storage media;

sequentially removeably disposing each of said plurality of data storage media in said first data storage device;

recording said information on said plurality of data storage media; and ensuring that extended capacity mode is maintained while recording said information on said plurality of data storage media.

4. The method of claim 1, further comprising the step of configuring said first data storage device to permit use of said extended capacity mode.

5. The method of claim 4, further comprising the step of specifying a CAPACITYMODE(EXTENDED) attribute for said first data storage device.

6. The method of claim 1, wherein said first data storage device is disposed in a data storage and retrieval system comprising one or a plurality of data storage devices and an operating system, wherein said operating system comprises a Unit Control Block Tape Class Extension for each of said one or a plurality of data storage devices, further comprising the steps of:

defining an esoteric group which comprises one or more of said one or a plurality of data storage devices, wherein said esoteric group includes said first data storage device;

determining whether each of said one or a plurality of data storage devices comprising said esoteric group is capable of extended capacity mode operation;

creating a USERUNITTABLE which, in the event each of said one or a plurality of data storage devices comprising said esoteric group is capable of extended capacity mode operation, indicates that said esoteric group is capable of extended capacity mode operation; and setting a capability indicator in a first Unit Control Block Tape Class Extension, wherein said first Unit Control Block Tape Class Extension recites the attributes for said first data storage device, indicating, in the event each of said one or a plurality of data storage devices comprising said esoteric group is capable of extended capacity mode operation, that said first data storage device is capable of using said extended capacity mode.

7. The method of claim 6, wherein said determining step further comprises the step of issuing a READ DEVICE CHARACTERISTICS command.

8. The method of claim 6, further comprising the steps of:

checking said first Unit Control Block Tape Class Extension to determine if said first data storage device is capable of using said extended capacity mode; and setting a request indicator requesting said first data storage device use said extended capacity mode.

9. The method of claim 8, wherein said data storage and retrieval system comprises a host computer and an application running on said host computer, wherein said application includes a CAPACITYMODE=XCAP command, and wherein said operating system comprises a DCBE macro, wherein said DCBE macro includes a DCBE_REQST_XCAP attribute, further comprising the steps of:

issuing said CAPACITYMODE=XCAP command;

setting said DCBE_REQST_XCAP attribute to ON.

10. The method of claim 8, further comprising the steps of:

receiving said request indicator;

issuing a command to switch said first data storage device from said default capacity mode to said extended capacity mode;

determining if said first data storage device was switched from said default capacity mode to said extended mode capacity;

providing an error message in the event said first data storage device was not switched from said default mode capacity to said extended mode capacity; and setting a status indicator in the event said first data storage device was switched from said default mode capacity to said extended mode capacity.

11. The method of claim 10, wherein said operating system further comprises a UCBCX_32BIT_INUSE attribute, wherein said setting a status indicator step comprises setting said UCBCX_32BIT_INUSE attribute to ON.

12. The method of claim 10, wherein said DCBE macro comprises a DCBE_32BIT_INUSE attribute, further comprising the step of setting said DCBE_32BIT_INUSE attribute to ON.

13. A data storage and retrieval system comprising a computer useable medium having computer readable program code disposed therein for increasing the storage capacity of a data storage medium movably disposed in said data storage and retrieval system, wherein said data storage and retrieval system comprises a host computer, an operating system, and a first data storage device comprising a fixed device architecture, wherein said first data storage device is capable of operating in a default capacity mode or in an extended capacity mode, wherein said first data storage device is capable of switching between said default capacity mode and said extended capacity mode, and wherein said default capacity mode utilizes a 22 bit blockid format and said extended capacity mode utilizes a 32 bit blockid format, the computer readable program code comprising a series of computer readable program steps to effect:

receiving designated information;

removeably disposing a designated data storage medium in said first data storage device;

receiving a request to record said designated information on said designated data storage medium using said extended capacity mode;

placing said first data storage device in said extended capacity mode;

recording said designated information on said designated data storage medium using said extended capacity mode.

14. The data storage and retrieval system of claim 13, wherein said computer readable program code further comprises a series of computer readable program steps to effect switching said first data storage device to said default capacity mode from said extended capacity mode after recording said designated information on said designated storage media.

15. The data storage and retrieval system of claim 13, wherein said computer readable program code further comprises a series of computer readable program steps to effect:
   sequentially removeably disposing a plurality of data storage media in said first data storage device;
   recording said information on said plurality of data storage media; and
   ensuring that extended capacity mode is maintained while recording said information on said plurality of data storage media.

16. The data storage and retrieval system of claim 13, wherein said computer readable program code further comprises a series of computer readable program steps to effect configuring said first data storage device to permit use of said extended capacity mode.

17. The data storage and retrieval system of claim 16, wherein said computer readable program code further comprises a series of computer readable program steps to effect specifying a CAPACITYMODE(EXTENDED) attribute for said data storage device.

18. The data storage and retrieval system of claim 13, wherein said operating system comprises a unit control block extension, further comprising the steps of:
   defining an esoteric group which comprises one or more of said one or a plurality of data storage devices, wherein said esoteric group includes said first data storage device;
   determining whether each of said one or a plurality of data storage devices comprising said esoteric group is capable of extended capacity mode operation;
   creating a USERUNITTABLE which, in the event each of said one or a plurality of data storage devices comprising said esoteric group is capable of extended capacity mode operation, indicates that said esoteric group is capable of extended capacity mode operation; and
   setting a capability indicator in a first Unit Control Block Tape Class Extension, wherein said first Unit Control Block Tape Class Extension recites the attributes for said first data storage device, indicating, in the event each of said one or a plurality of data storage devices comprising said esoteric group is capable of extended capacity mode operation, that said first data storage device is capable of using said extended capacity mode.

19. The data storage and retrieval system of claim 18, wherein said operating system comprises a READ DEVICE CHARACTERISTICS command, and wherein said computer readable program code further comprises a series of computer readable program steps to effect issuing said READ DEVICE CHARACTERISTICS command.

20. The data storage and retrieval system of claim 13, wherein said computer readable program code further comprises a series of computer readable program steps to effect receiving a request from said host computer to place said first data storage device in said extended capacity mode.

21. The data storage and retrieval system of claim 20, wherein said operating system comprises a DCBE macro, wherein said DCBE macro includes a DCBE_REQST_XCAP attribute, wherein said computer readable program code further comprises a series of computer readable program steps to effect setting said DCBE_REQST_XCAP attribute set to ON.

22. The data storage and retrieval system of claim 20, wherein said computer readable program code further comprises a series of computer readable program steps to effect:
   determining if said first data storage device was switched from said default mode capacity to said extended mode capacity;
   providing an error message in the event said first data storage device was not switched from said default mode capacity to said extended mode capacity; and
   setting a status indicator in the event said first data storage device was switched from said default mode capacity to said extended mode capacity.

23. The data storage and retrieval system of claim 22, wherein said operating system comprises a UCBCX_32BIT_INUSE attribute, wherein said computer readable program code further comprises a series of computer readable program steps to effect setting said UCBCX_32BIT_INUSE attribute to ON in the event said first data storage device was switched from said default mode capacity to said extended mode capacity.

24. The data storage and retrieval system of claim 22, wherein said operating system comprises a DCBE_32BIT_INUSE attribute, wherein said computer readable program code further comprises a series of computer readable program steps to effect setting said DCBE_32BIT_INUSE attribute to ON in the event said first data storage device was switched from said default mode capacity to said extended mode capacity.

25. A computer program product comprising a data management system usable with one or more computer processors disposed in a data storage and retrieval system, said computer program product having computer readable program code embodied therein for increasing the storage capacity of a data storage medium, wherein said data storage and retrieval system includes a first data storage device having a fixed device architecture, wherein said first data storage device is capable of operating in a default capacity mode or in an extended capacity mode, wherein said first data storage device is capable of switching between said default capacity mode and said extended capacity mode, and wherein said default capacity mode utilizes a 22 bit blockid format and said extended capacity mode utilizes a 32 bit blockid format, comprising:
   computer readable program code which causes one of said one or more computer processors to provide designated information to said first data storage device;
   computer readable program code which causes one of said one or more computer processors to removeably dispose said designated data storage medium in said first data storage device;
   computer readable program code which causes one of said one or more computer processors to receive a request to record said designated information on said data storage medium using said extended capacity mode;
   computer readable program code which causes one of said one or more computer processors to switch said first data storage device to said extended capacity mode from said default capacity mode; and
   computer readable program code which causes one of said one or more computer processors to record said designated information on said data storage medium using said extended capacity mode.

26. The computer program product of claim 25, further comprising computer readable program code which causes one of said one or more computer processors to switch said first data storage device to said default capacity mode from said extended capacity mode after said first data storage device records said designated information on said designated data storage medium.

27. The computer program product of claim 25, further comprising:
   computer readable program code which causes one of said one or more computer processors to sequentially removeably dispose a plurality of data storage media in said first data storage device; and
   computer readable program code which causes one of said one or more computer processors to ensure that extended capacity mode is maintained while said information is being recorded on said plurality of data storage media.

28. The computer program product of claim 25, further comprising computer readable program code which causes one of said one or more computer processors to configure said first data storage device to permit use of said extended capacity mode.

29. The computer program product of claim 28, further comprising:
   computer readable program code which causes one of said one or more computer processors to specify a CAPACITYMODE(EXTENDED) attribute for said first data storage device.

30. The computer program product of claim 28, further comprising:
   computer readable program code which causes one of said one or more computer processors to define an esoteric group which comprises one or more of said one or a plurality of data storage devices, wherein said esoteric group includes said first data storage device;
   computer readable program code which causes one of said one or more computer processors to determine whether each of said one or a plurality of data storage devices comprising said esoteric group is capable of extended capacity mode operation;
   computer readable program code which causes one of said one or more computer processors to create a USERUNITTABLE which, in the event each of said one or a plurality of data storage devices comprising said esoteric group is capable of extended capacity mode operation, indicates that said esoteric group is capable of extended capacity mode operation; and
   computer readable program code which causes one of said one or more computer processors to set a capability indicator in a first Unit Control Block Tape Class Extension, wherein said first Unit Control Block Tape Class Extension recites the attributes for said first data storage device, indicating, in the event each of said one or a plurality of data storage devices comprising said esoteric group is capable of extended capacity mode operation, that said first data storage device is capable of using said extended capacity mode.

31. The computer program product of claim 30, further comprising:
   a READ DEVICE CHARACTERISTICS command;
   computer readable program code which causes one of said one or more computer processors to issue said READ DEVICE CHARACTERISTICS command.

32. The computer program product of claim 25, wherein said data storage and retrieval system further comprises a host computer, further comprising:
   computer readable program code which causes one of said one or more computer processors to receive a request from said host computer to switch said first data storage device to said extended capacity mode from said default capacity mode; and
   computer readable program code which causes one of said one or more computer processors to issue a command switching said first data storage device from said default capacity mode to said extended capacity mode.

33. The computer program product of claim 25, further comprising:
   a DCBE_REQST_XCAP attribute;
   computer readable program code which causes one of said one or more computer processors to set said DCBE_REQST_XCAP attribute to ON.

34. The computer program product of claim 32 further comprising:
   computer readable program code which causes one of said one or more computer processors to determine if said first data storage device was switched from said default mode capacity to said extended mode capacity;
   computer readable program code which causes one of said one or more computer processors to provide an error message in the event said first data storage device was not switched from said default mode capacity to said extended mode capacity; and
   computer readable program code which causes one of said one or more computer processors to set a status indicator in the event said first data storage device was switched from said default mode capacity to said extended mode capacity.

35. The computer program product of claim 25, further comprising:
   a UCBCX_32BIT_INUSE attribute;
   computer readable program code which causes one of said one or more computer processors to set said UCBCX_32BIT_INUSE attribute to ON in the event said first data storage device was switched from said default mode capacity to said extended mode capacity.

36. The computer program product of claim 28, further comprising:
   a DCBE_32BIT_INUSE attribute;
   computer readable program code which causes one of said one or more computer processors to set said DCBE_32BIT_INUSE attribute to ON in the event said first data storage device was switched from said default mode capacity to said extended mode capacity.

* * * * *